Feb. 6, 1940.  A. I. EDDY  2,189,463
PRIMARY BATTERY
Filed Oct. 24, 1936
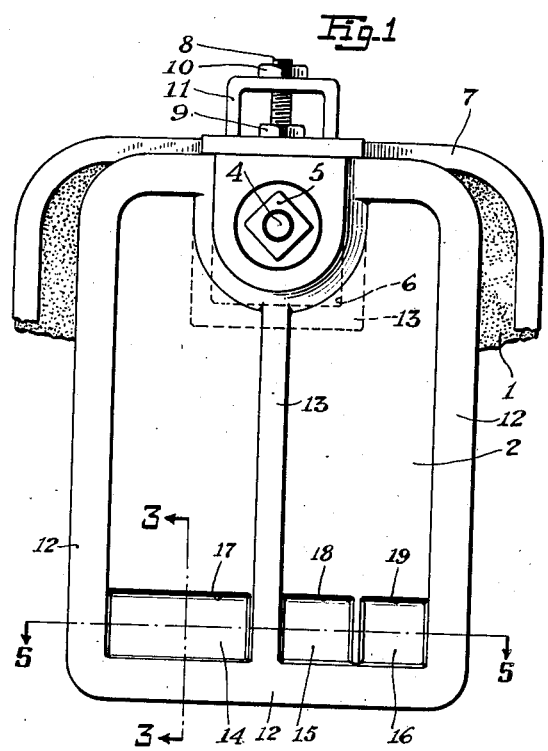
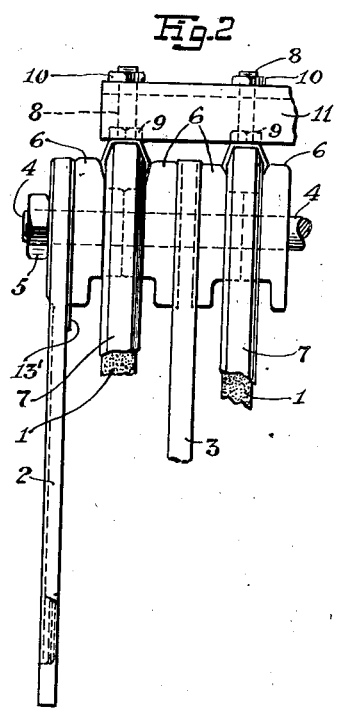
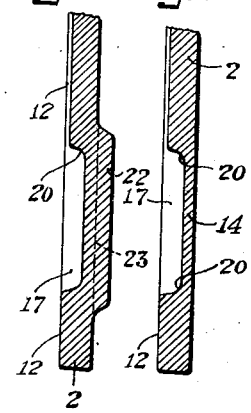
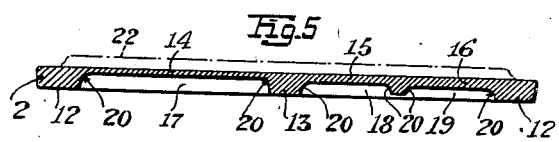
INVENTOR
Albert J. Eddy
BY Henry Lanahan
ATTORNEY Patented Feb. 6, 1940

2,189,463

UNITED STATES PATENT OFFICE 2,189,463

PRIMARY BATTERY

Albert I. Eddy, Hillside, N. J., assignor to Thomas A. Edison, Incorporated, West Orange, N. J., a corporation of New Jersey Application October 24, 1936, Serial No. 107,309

4 Claims. (Cl. 136—125)

My invention relates to primary batteries having positive electrode elements which are consumable in the discharging operation, and while not limited thereto, is especially directed to that type of primary batteries wherein the negative electrode comprises an element or elements of oxide of copper or other suitable depolarizing material, the positive electrode comprises an element or elements of zinc and such electrodes are disposed in a suitable alkaline electrolyte solution.

In a battery of this type, the negative and positive electrode elements, whether cylindrical or in the form of plates, are usually assembled in opposed and alternate relation with each negative element suitably spaced and insulated from each adjacent positive element and with a positive element or positive elements outermost; and such assembly and the electrolyte solution are disposed in a transparent jar or container of glass or the like, whereby an observer may at any time, readily note the condition of the said outermost positive element or elements.

It has heretofore been proposed to provide an outermost consumable positive electrode element of such a battery, with means designed to give advance indication to an observer of the approaching exhaustion of the battery so that he may be prepared to renew or replace the same or the element assembly thereof. This means comprised a small concave shallow depression, or small concave shallow depressions of equal depth, in the said electrode element, which provided a section or sections of small area and of slightly reduced thickness as compared with the main body portion of such element. Perforations in such an electrode element due to consumption thereof upon discharge of a battery in which the same was embodied would first appear in the said section or sections of reduced thickness thereby giving indication of approaching battery exhaustion. Where but a single and only approximate indication of approaching battery exhaustion is required, as is the case in a good many services for which wet primary batteries are commonly used, the construction just described is usually satisfactory. Also it is quite feasible to produce zinc electrode elements having indicator sections of only slightly reduced thickness, by casting the same in suitable molds. In this connection it may be noted that in the commercial manufacture of zinc electrode elements for batteries of the type described above, it is common practice to cast the same because this is the most practicable, effective and economical method of producing elements having the desired physical characteristics.

It has also previously been proposed to provide an outermost zinc electrode element in a battery of the character under discussion, with means designed to give indications of energy expended and of that remaining available, at a plurality of different and distinct points in the life of the battery. This means, in the case of a given electrode element, comprised a plurality of small concave depressions of different depths in the element, whereby the latter would have a like number of small sections each of a thickness different from the others and less than that of the main portion of the element. It is to be expected that such an element, during the discharge of a battery in which it was present, would first become perforated at the deepest of such depressions or, in other words, at the thinnest of the said small reduced sections, and that with the progressive consumption of the element, the latter would become perforated at the other of said depressions in the order of their depth. It was suggested that in the case of such an outer electrode element for a battery having a rated capacity of 500 ampere hours, this element be provided with four of the said concave depressions of such depths as to result in perforations thereat upon the expenditure of 100, 200, 300 and 400 ampere hours respectively. There are, however, several objections to and short-comings in the construction just described, particularly when applied to cast zinc elements; and in so far as I am aware, neither this nor any like construction designed to provide an indication or indications of the extent of battery exhaustion at a point or points early in the rated life of a battery, has at any time prior to my invention been adopted commercially. Each of the concave depressions of such a construction would result in but a single exhaustion indication. Moreover it is practically impossible by the usual methods, to produce cast zinc elements having reduced sections of the relative thinness and structural characteristics required to provide suitable exhaustion indications during the early part of the rated life of the batteries in which said elements may be used; for it has been found that in the casting operation proper distribution of the molten metal cannot be obtained as the same will not flow freely, and sometimes not at all, into all parts of the contracted mold spaces which correspond to the said relatively thin reduced sections of the zinc elements, and that perforations, blow-holes, or other casting or grain structure imperfections will therefore almost invariably be present in these sections. Consequently indications obtained by the provision of such thin reduced sections in a cast zinc electrode element would be so faulty as to be valueless for the purpose of determining with reasonable accuracy the amount of energy expended and that still available, at points early in the life of the battery.

There has recently developed a considerable and growing demand for batteries of the character above described, especially those of high capacity, e. g. 1,000 ampere hours, as power reserve in services where current is required to be continuously supplied at high discharge rates. The provision of outer consumable positive elements of such batteries with sections of only slightly reduced thickness as compared with the main body portions of the elements, whereby there will be obtained visual indication of approaching exhaustion of the batteries but slightly in advance of the end of the rated life thereof, is highly unsatisfactory when the batteries are relied upon for the class of service just mentioned. Under these circumstances, batteries would frequently be put into use as the reserve source of power with only a small part, in some cases as little as 5%, of their rated capacity unexpended and available; and in case of a prolonged failure of the main source of power such an amount of reserve capacity would be grossly inadequate. It is obvious that where batteries are to be relied upon for this class of service, it is highly important to be able to determine, before actually resorting to the batteries as a source of reserve power, whether the same have sufficient remaining available capacity to supply the amount of energy which may be required. For this purpose it is preferable that such batteries be provided with means designed and adapted to give definite and accurate indications of the energy or capacity expended and that still available at points which are both late and comparatively early in the rated life of the batteries; and a primary object of my invention is to provide positive electrode elements of improved construction for batteries of the character above described whereby this desired result will be effectively attained.

Another object of my invention is to provide for batteries of this character, an improved form of positive electrode element having a plurality of reduced sections or panels which are so designed that there will be obtained twice as many separate and distinct indications of energy expended and of that still available as the number of such sections or panels.

My invention also includes a simple and novel method for effectively producing positive electrode elements which embody my improved indicating construction.

Other objects and features of my invention will be hereinafter more fully described and claimed.

For a clearer understanding of my invention, attention is directed to the drawing which accompanies and forms part of this specification and in which:

Fig. 1 is a fragmentary view in end elevation, of a primary battery electrode element assembly wherein the outermost positive element embodies one form of my improved indicating construction;

Fig. 2 is an elevational view looking from the right of Fig. 1;

Fig. 3 is a sectional view of the outermost positive element of the assembly shown in Figs. 1 and 2, taken on line 3—3 of Fig. 1;

Fig. 4 is a view similar to Fig. 3 illustrating the form of the outermost positive element of the assembly shown in Figs. 1 and 2 at one stage in the process of producing such element; and Fig. 5 is a sectional view of the outermost positive element of the assembly shown in Figs. 1 and 2, taken on line 5—5 of Fig. 1.

Referring to the drawing, Figs. 1 and 2 illustrate an electrode element assembly for a primary battery of the type in which negative elements consisting of highly compressed and agglomerated plates of copper oxide and positive elements consisting of zinc plates are immersed in a suitable alkaline electrolyte solution such, for example, as an approximately 20% solution of caustic soda. The complete electrode element assembly comprises a plurality of negative and positive plates disposed side by side in alternate arrangement wherein each of the two outermost or end electrode elements is a zinc or positive plate; but there is shown in the drawing only a part of the assembly including two of the negative plates 1, 1, and two of the positive plates 2, 3. As is customary in primary battery structures such as shown, the negative and positive plates are secured firmly together to provide a unitary element assembly by means comprising a rod or bolt 4 extending through the upper end portions of the plates, and nuts 5 (only one of which is shown) threaded on to the ends of said rod, and said plates are maintained in properly spaced and insulated relation by blocks 6 formed of porcelain or other suitable insulating material. The negative plates are respectively closely embraced at their edge portions by frames 7 formed of conductive material, such as copper or copper plated steel, and are rigidly secured, as by means of short threaded rods 8 and nuts 9, 10, to a supporting yoke 11 in good electrical connection therewith. The yoke 11 extends transversely of the assembled plates in a position directly above the negative plates, and the entire element assembly is adapted to be suspended from the cover of the usual glass jar or container in a suitable electrolyte solution with which such jar or container is partially filled, by means comprising a conductive rod (not shown) connected to the yoke 11 and extending upwardly therefrom.

The zinc plate 2, which is one of the two outermost or end plates of the assembly, is provided on its outer side or face with the customary reenforcing ribs 12 and 13 at the edges and centrally thereof so that the original configuration of the plate will be maintained substantially throughout the rated life of the battery in which the assembly is embodied. The inner side or face of plate 2 is plane except for the rib or projecting portion 13' which is located at the upper end portion thereof and provides a seat for the adjacent spacing and insulating block 6. My improved means for obtaining indications of energy expended as embodied in the plate 2, comprises three rectangular panels or sections 14, 15 and 16 provided in the main body portion of the plate just above the lower reenforcing rib 12. These panels are of different or graduated thicknesses, are each of reduced thickness as compared with the main body portion of the plate, and are formed by providing the plate 2, preferably on its outer side, that is the side farthest from the adjacent negative plate 1, with corresponding rectangular depressions 17, 18 and 19 of different depths. The major portion of each of said depressions is of uniform depth and accordingly the corresponding panel has a major portion of appreciable area which is of uniform thickness. The side walls of the depressions 17, 18 and 19, preferably flare outwardly somewhat, as shown, and in the case of each of said depressions, curved and preferably concave surfaces 20 of small radius are formed at the base of the depression and join and merge into the surfaces of the side walls of the depression and the surface which constitutes or defines the bottom of the depression and the outer face of the main portion of the corresponding panel. The embodiment of the features just described, namely the flaring side walls and curved surfaces 20 of the said depressions, facilitates the production of zinc plates having such depressions by casting. Moreover, by reason of the curved surfaces 20, each of the panels 14, 15 and 16 comprises a relatively narrow portion at the juncture of the panel with the main body portion of the plate, which portion extends entirely about the main uniformly thick portion of the panel and is of somewhat increased thickness as compared with said main portion.

The provision of the panels 14, 15 and 16 in plate 2 with the narrow and relatively thick portions at the junctures of the panels with the main body portion of the plate is an important feature, for this results in two accurate indications of energy expenditure and residual energy or capacity being provided by each panel at two separate and definite points in the rated life of a battery in which the plate is present; one such indication being given when small holes appear in the main uniformly thick portion of the panel as the plate is being consumed, and the second indication being given later when substantially the entire panel becomes eaten away. Accordingly it will be apparent that six separate and distinct indications of the energy expended and that still available will be obtained at six different points respectively in the rated life of a battery which embodies the structure shown and specifically described herein. The indicator panels of plate 2 may be so designed that the indications will be given at those points in the life of the battery which are considered most desirable. Experience has shown that where a battery is to be used as a source of power reserve in a service of the class mentioned above, it is preferable to provide an indicator panel design for the outer positive electrode elements, which will result in the giving of such indications respectively at a point slightly in advance of one-half of the rated life of the battery, at one-half of said rated life, at a point slightly in advance of two-thirds of said rated life, at two-thirds of said rated life, at a point slightly in advance of the end of such rated life, and at the end of the rated life of the battery. In actual practice, for example, outermost cast zinc elements of primary batteries having a rated capacity of 1,000 ampere hours and adapted for use in the class of service just referred to, are made with three indicator panels so designed as to provide six separate and distinct visual indications of the expenditure of 450, 500, 700, 750, 950 and 1,000 ampere hours respectively.

However, the commercial production of such zinc elements having a plurality of indicator panels of the design and structure required to provide the several indications of energy expenditure at the desired different points in the rated life of batteries in which the elements are used, presented several difficulties. For reasons which have already been fully explained, it was found impossible by ordinary casting methods, to produce zinc elements or plates with panels of the structure and of the relative thinness (as exemplified by the panels 14 and 15, particularly the former, shown in the drawing) required to provide accurate or dependable such indications at a point or points early in the life of the batteries. A natural suggestion to make would be that the panels could be produced in otherwise finished cast zinc electrode elements by any of a number of common machining methods. Such a machining method would result in sharp angles at the junctures of the panels in the main body portions of the electrode elements instead of the desired rounded corners or curved connecting surfaces, indicated at 20 in Figs. 3, 4 and 5. Such sharp angles or corners are to be avoided because the more rapid consumption of the metal which occurs at such points is likely to result in the entire panel falling out before being eaten through at any other point. This would result in but a single and very inaccurate indication being obtained by the provision of such a panel, instead of the two definite and accurate indications obtained by the provision of a panel of the design above described. While it is not impossible to machine panels in the zinc electrode elements with rounded corners or surfaces at the junctions thereof with the main body portions of said elements, the difficulties encountered are so great as to render it entirely impracticable to do this.

The impossibility of casting zinc electrode elements with panels of the proper thickness to provide suitable or dependable exhaustion indications at a point or points early in the life of batteries, and the impracticability of properly forming the panels by machining, led to my evolving a method by which the desired results may be effectively obtained and which may be considered as sort of a combination of the casting and machining methods referred to. As employed in producing an electrode element in the form of the zinc plate 2 having the indicator panels 14, 15 and 16, this method consists in casting the plate from molten zinc in a mold which is of such design that upon removal of the plate therefrom the latter is substantially in its finished form, except that on the otherwise substantially plane side thereof it has a fairly thick laterally projecting portion 22 which is of greater area than the depressions 17, 18 and 19 and is located oppositely to the latter so as to overlap the same at all of their edges, as shown in Fig. 4 and in dot dash lines in Fig. 5. By reason of the provision which must be made for casting the plate with the said laterally projecting portion 22, those opposed sections of the mold corresponding in location to the finished panels 14, 15 and 16 of the plate will be so spaced that in the casting operation, the molten zinc will flow freely into and completely fill the panel spaces with the result that panel sections are produced which are substantially homogeneous throughout and of uniform texture. As a final step in the method, the projecting portion 22 on the zinc element as cast is removed, preferably by a simple machining operation, so that the corresponding surface portion of the inner side of the plate or element will be flush with the adjacent surface portions, as indicated by the dotted line 23 in Fig. 4. I find that by the use of a milling cutter of standard design, when equipped with a tool of the proper size and form, the said portion 22 of the zinc element may readily be cut away in a single operation.

My improved combination casting and machining method renders it possible to produce electrode elements having very thin indicator panels of the shape and physical characteristics required to attain the objectives sought. Practical use of paneled plates so produced has demonstrated that the visual battery exhaustion indications thereby obtained are very accurate, being subject only to about two percent. error either way.

While my invention has been specifically described in connection with primary battery electrode elements in the form of flat plates, it will be understood that the same is equally applicable to such electrode elements which are cylindrical or other suitable form. Also while the indicator panels shown and described are rectangular, it is obvious that they may be circular or of other suitable form.

Having now described my invention, I claim:

1. A consumable primary battery electrode element having a plurality of depressions of different depths respectively whereby the element is provided with a plurality of sections of reduced thickness as compared with the main body portion of the element, each of said reduced sections comprising a portion of appreciable area which is of a substantially uniform thickness different from the thickness of the corresponding portion of each of the other of said sections and a portion of increased thickness about said first portion and disposed between the latter and the side walls of the corresponding depression, said portion of increased thickness having a surface formed on a smooth curve and merging into the adjacent surfaces of the said side walls and of the respective portion of uniform thickness.

2. A cast zinc primary battery electrode element having a plurality of depressions of different depths respectively whereby said element is provided with a plurality of sections of reduced thickness as compared with the main body portion of the element, each of said sections comprising a portion of appreciable area having a substantially uniform thickness different from the thickness of the corresponding portion of each of the other of said sections and a relatively thick portion disposed between the side walls of the corresponding depression and the corresponding portion of uniform thickness, said relatively thick portion having a concave surface which joins and merges into the adjacent surfaces of the said side walls and of the respective portion of uniform thickness.

3. In a primary battery, an electrode element assembly comprising a plurality of alternately arranged positive and negative elements, said positive elements being consumable in the discharging operation of the battery, an outermost element of the assembly being a positive element, said outermost positive element having a plurality of depressions of different depths respectively on the side thereof farthest away from the adjacent negative element whereby the same is provided with a plurality of sections of reduced thickness as compared with the main body portion of the element, each of said sections comprising a portion of appreciable area having a substantially uniform thickness different from that of the corresponding portion of each of the other of said sections and a relatively thicker portion disposed about the said portion of uniform thickness and between the latter and the side walls of the respective depression, the surface of said relatively thicker portion being formed on a smooth curve and merging into the adjacent surfaces of the said side walls and of the respective portion of uniform thickness.

4. In a primary battery, an electrode element assembly comprising a plurality of alternately arranged positive and negative electrode elements, said positive elements being formed of cast zinc and an outermost element of the assembly being such a cast zinc element, the said outermost zinc element having a plurality of depressions of different depths on the side thereof farthest away from the adjacent negative element whereby the same is provided with a plurality of sections of reduced thickness as compared with the main body portion of the element, each of said sections comprising a portion of appreciable area having a substantially uniform thickness different from that of the corresponding portion of each of the other of said sections and a relatively thick portion disposed between the side walls of the corresponding depression and the respective portion of uniform thickness, said relatively thick portion having a concave surface which joins and merges smoothly into the adjacent surfaces of said side walls and of the respective portion of uniform thickness.

ALBERT I. EDDY.